United States Patent [19]

Brooks

[11] 4,279,219

[45] Jul. 21, 1981

[54] LIGHT RESPONSIVE ANIMAL ACTUATED APPARATUS

[75] Inventor: Cletus A. Brooks, Onsted, Mich.

[73] Assignee: Selective Feeder Company, Onsted, Mich.

[21] Appl. No.: 88,378

[22] Filed: Oct. 26, 1979

[51] Int. Cl.³ .............................................. A01K 5/02
[52] U.S. Cl. .................................................. 119/51 R
[58] Field of Search ...................... 119/51 R, 52 AF; 250/216, 571, 572, 221, 229, 232, 578

[56] References Cited

U.S. PATENT DOCUMENTS

| | | | |
|---|---|---|---|
| 3,557,757 | 1/1971 | Brooks | 119/51 R |
| 3,750,626 | 8/1973 | Smith | 119/51 R |
| 3,788,278 | 1/1974 | Propst et al. | 119/51 R |
| 3,929,277 | 12/1975 | Byrne et al. | 119/51 R |
| 4,129,855 | 12/1978 | Rodrian | 119/51 R |
| 4,162,683 | 7/1979 | Brooks | 119/51 R |

Primary Examiner—Jay N. Eskovitz
Attorney, Agent, or Firm—Beaman & Beaman

[57] ABSTRACT

The invention pertains to automatic animal actuated apparatus, such as a power operated feeder, wherein an actuator worn by the animal is employed to control light sensing means operatively associated with the servicing apparatus. Interrogation means adjacent an animal station utilizes a plurality of light sensing devices oriented in a predetermined manner to magnetic orientation means. An actuator worn by the animal contains orientation means of a magnetic type for permitting predetermined orientation of the actuator to the interrogation light sensing devices, and a coded light transmitting pattern defined upon the actuator permits interrogation of the actuator by the passage of light therethrough to control the servicing apparatus in the desired manner.

14 Claims, 6 Drawing Figures

LIGHT RESPONSIVE ANIMAL ACTUATED APPARATUS

BACKGROUND OF THE INVENTION

Advancements in the animal husbandry art have determined that maximum animal production, whether the raising of meat, or the production of milk, is most efficiently accomplished, and the highest production and lowest unit costs of produce achieved, if the animals are individually categorized and serviced. For instance, maximum beef or milk production within a herd can be achieved if each animal receives the proper amount of feed and feed supplements for its particular breed, age, size, sex, and other individual traits.

Automatic animal identification and servicing apparatus, such as feeders, have been developed to permit the automatic individualized treatment of animals, and a number of devices are known wherein an animal may be quickly identified by a tag or actuator worn which cooperates with switching apparatus for instigating feed dispensing, or initiating other control apparatus for the purpose of identification, counting, weighing, or the like. In this respect, reference is made to U.S. Pat. Nos. 3,557,758; 3,750,626; 3,788,278; 3,929,277 and 4,129,855. Additionally, the applicant has originated automatic animal feeder devices employing magnetic actuators worn by the animal as shown in U.S. Pat. Nos. 3,557,757 and 4,162,683.

Animal servicing apparatus initiated by animal worn actuators will occasionally malfunction or fail to operate due to problems orienting the actuator to the interrogater. For instance, if the interrogater utilizes magnetically controlled reed switches, or other proximity devices, the animal worn actuator must be positioned adjacent the switch within relatively close tolerances in order to achieve the desired operation. Likewise, interrogators utilizing radio frequency detectors, impedence coils, and other electrical and electronic apparatus, are sensitive to the orientation of the actuator to the interrogation means and inconsistent operation may result.

Further, prior art devices have been relatively limited in the number of animals which could be individually identified and serviced. Interrogation and actuation apparatus controlled by magnets may only be able to initiate two or three distinct operational functions, and radio controlled apparatus, likewise, only permits a limited number of animals to be individually identified for servicing purposes.

It is a object of the invention to provide animal actuated apparatus of an automatic nature which permits a relatively large number of animals to be individually identified and serviced, the animals being accurately identifiable, and the likelihood of improper identification being minimized.

Another object of the invention is to provide animal actuated apparatus controlled by an animal worn actuator which is light responsive whereby the actuator selectively permits energizing of predetermined light sensing devices to achieve the desired control functions for a particular animal.

An additional object of the invention is to provide a light responsive animal actuated apparatus for servicing animals which is of economical manufacture, dependable in operation, and utilizes enabling apparatus to prevent malfunctioning and false readings.

In the practice of the invention interrogation means are defined at the animal station wherein the animal is to be serviced. For instance, at a feeder station the interrogation means is located adjacent a feed hopper at that portion disposed adjacent the animal's lower neck as it inserts its head into the hopper. The interrogation means consists of a plurality of light sensing devices, such as photocells, dimensionally related to orientation means in the form of a permanent magnet. Also, preferably, a light source is located adjacent the light sensing means to introduce light thereon when energized.

The actuator is suspended from a necklace worn by the animal, wherein, upon the animal inserting its head into the feeder the actuator will be disposed adjacent the interrogation apparatus. The actuator consists of a light opaque member of nonmagnetic material having a permanent bar magnet mounted thereon having its poles so oriented with respect to the interrogation magnet that the two magnets will attract and orient the actuator to the light sensing devices in a predetermined manner. Light transmitting windows defined in the actuator cause selected light sensing devices to be masked or exposed to light, and the actuator includes opaque enabling masks for shading predetermined light sensors to indicate to the interrogator that the actuator is properly located thereon. By using a plurality of light sensing devices it is possible to identify a considerable number of animals with a relatively small actuator, and such identification will be positive.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
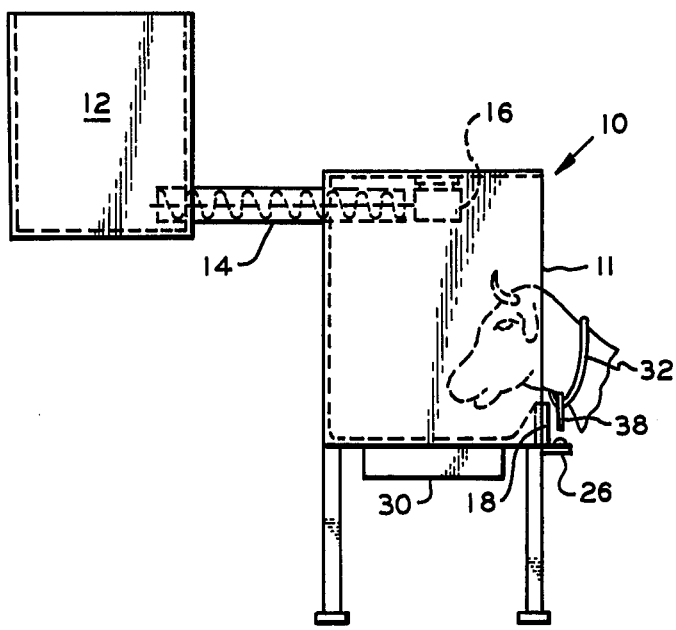
FIG. 1 is a side elevational view of a typical feed reservoir and hopper utilizing the animal actuated apparatus of the invention.
Figure 2:
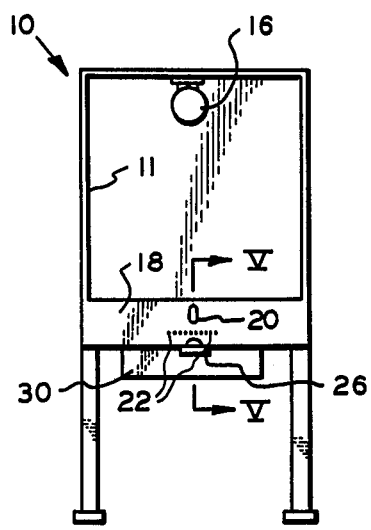
FIG. 2 is a front elevational view of the apparatus of FIG. 1.

While the invention may be utilized to control a variety of animal services, such as feeding, weighing, milk production, medication, etc., the operation and relationship of components will be appreciated from the described application wherein a feeder is illustrated.

A feed hopper 10 defines a chamber having a front opening 11 into which the animal's head may be inserted for access to feed contained therein. Feed is supplied to the hopper from a reservoir 12 through a screw conveyor 14 energized by electric motor 16 whereby operation of the electric motor draws the feed from the reservoir into the hopper 10 for consumption by the animal.

Figure 5:
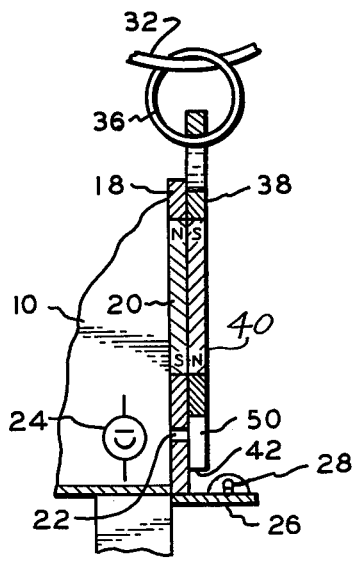
FIG. 5 is an elevational sectional view taken through the interrogation plate along Section V—V of FIG. 2.

The hopper 10 includes an interrogator plate 18 extending across the bottom of the opening 11, the animal inserting its head over the plate 18. Centrally, the interrogator plate includes a permanent magnet 20 of the bar type having a pole at each end and in the disclosed embodiment the poles are vertically oriented with respect to each other as indicated in FIG. 5. Below the magnet 20 a plurality of openings 22 are defined in the plate 18, ten in the disclosed embodiment, and a plurality of photocells 24 are located adjacent the inner side of the plate 18 and openings 22, FIG. 5, a photocell being disposed adjacent each opening 22, such that light passing through an opening is sensed by the associated photocell 24.

A light source is preferably disposed adjacent the openings 22, and in the disclosed embodiment the light source is mounted upon a plate 26 extending from the bottom of plate 18 having an electric lamp 28 mounted thereon. Light emitting from lamp 28 enters the openings 22 for sensing by the associated photocells 24.

The photocells 24 are electrically connected to control means, schematically illustrated at 30 as mounted on the underside of the hopper 10, such control means being operatively connected to the motor 16 for controlling the operation thereof. The control means includes computer type circuits whereby information may be stored therein, and the control functions will be determined as initiated by the control means and the data stored therein. Thus, upon the interrogation sensing apparatus sensing the presence of a particular animal at the hopper the hopper motor 16 will operate for that length of time desired for that particular animal. If the particular animal is to receive feed a specific number of times within a given duration, i.e., four feedings each 24 hours, the control means computer will keep track of the number of feedings per unit of time and disperse the feed for each animal according to the predetermined program. It will be understood that hopper 10 may have a plurality of reservoirs 12 and conveyors 14 associated therewith wherein different types of feed and supplements may be simultaneously or sequentially introduced into hopper 10, and the control means 30 would regulate such conveyor operation as desired. The particular circuit used in the control means does not constitute a part of the instant invention, such control means being well known in the computer art, an example being described in U.S. Pat. No. 3,750,626.

Figure 3:
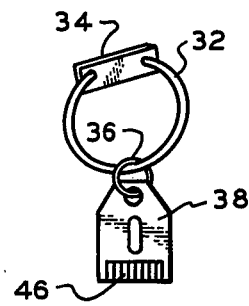
FIG. 3 is a perspective view of the actuator apparatus worn by the animal in accord with the invention.
Figure 4:
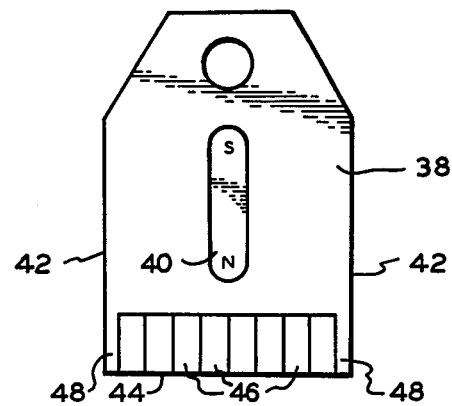
FIG. 4 is an enlarged elevational view of the actuator.

The actuator for the apparatus in accord with the invention is worn by the animal about its neck on a necklace, and as will be appreciated in FIG. 3, the necklace 32 is held together by a clip 34, and includes a ring 36 by which the actuator 38 is suspended from the necklace. The actuator 38 comprises a nonmagnetic opaque plate of aluminum, plastic, copper, etc., and is centrally provided with a permanent bar magnet 40 having poles located at its ends and vertically oriented with respect to each other.

The actuator 38 includes lateral edges 42 and lower edge 44, and as will be appreciated from FIG. 5, eight delineated portions 46 are defined on the actuator adjacent edge 44 which may be selectively removed to define a notch or window through which light may pass. The delineated portions 46 do not extend to the actuator lateral edges 42 and opaque enabling masks 48 are defined adjacent the edges 42 in horizontal alignment with the portions 46.

When the animal places its head inside the hopper 10 the actuator 38 will engage the interrogation plate 18. As the magnet 20 will attract the opposite poles of the actuator magnet 40, the magnet 20 will orient the actuator 38 on the plate 18 in an accurate predetermined manner wherein the portions 46 will be in alignment with the plate openings 22. Thus, those portions 46 which have been removed or notched, as at 50, FIG. 6, will permit light to enter the aligned openings 22, and the remaining openings 22 will be masked by the actuator.

Figure 6:
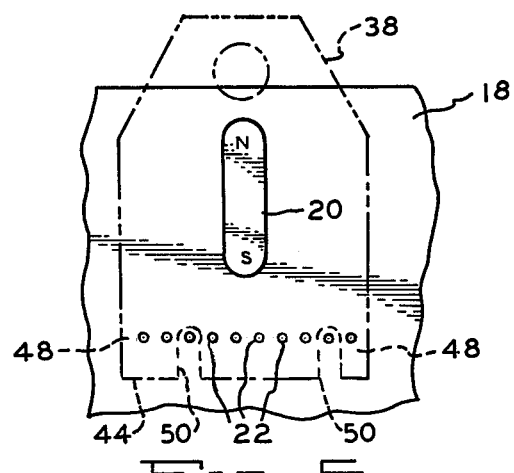
FIG. 6 is an enlarged, detail, front elevational view of the interrogation plate illustrating the actuator in operative position in dotted lines.

In order to insure proper alignment of the actuator 38 upon the interrogation plate 18 the masking portions 48 must mask the outer openings 22, FIG. 6, and upon the enabling portions 48 masking the outer openings and associated light sensing photocells, the control means 30 will be enabled to activate the photocell circuits so the control means will perform its programmed function as determined by which photocells are receiving light through an actuator notch 50, and which photocells are not receiving light. By using eight portions 46 two-hundred and fifty-six identification codes can be provided, and the feeder control will be operated in accordance with the preprogrammed schedule for that particular actuator and animal.

As the actuator 38 includes no moving or delicate parts the likelihood of damage thereto is greatly reduced as compared with animal worn actuators having tuned electronic circuits, transmitters or the like, and actuators in accord with the invention may be very economically produced. By using a greater number of notches 50, openings 22 and photocells 24 the number of animals that may be identified may be readily increased, and the interrogation system of the invention provides a great deal of versatility at a low cost.

When the animal withdraws its head from the hopper 10 the actuator 38 is readily separated from the magnet 20, and the control means is ready for the next cycle of operation. Of course, the amount of feed conveyed and the duration of the feeding time is determined by the program of the control means 30, and animals utilizing the invention soon become acquainted with the operation and the manner by which feed may be obtained.

In the above description the apparatus is described as light sensing, and it is to be appreciated that the invention can be practised utilizing a variety of radiant energy sources and sensors. In actual commercial use the lamp 28 emits infra red light and the photocells 24 are sensitive to infra red energy, thereby reducing the likelihood of malfunction due to visible light sensing.

It is appreciated that various modifications to the inventive concepts may be apparent to those skilled in the art without departing from the spirit and scope of the invention.

I claim:

1. A radient energy responsive animal actuated apparatus including animal servicing apparatus, an animal station adjacent said servicing apparatus, and control means controlling operation of said servicing apparatus, the improvment comprising, said control means including radiant energy sensing interrogation means, said interrogation means including a plurality of radiant energy sensing devices located adacent the animal station, a control means actuator worn by the animal to be serviced, said actuator comprising a radiant energy opaque member, at least one radiant energy transmitting window defined in said opaque member, enabling means defined upon said actuator enabling said control means to sense the interpret said actuator upon said actuator being oriented adjacent and relative to said interrogation means in a predetermined manner, and cooperating orientation means defined upon said interrogation means and said actuator orienting said actuator relative to said interrogation means upon said actuator being brought into proximity of said interrogation means by the animal to be serviced whereby said window selectively regulates the exposure of said radiant energy sensing devices to radiant energy.

2. In radiant energy responsive animal actuated apparatus as in claim 1 wherein said radiant energy sensing devices comprise photoelectric cells, said actuator comprises a plate attached to an animal necklace and said window is defined by an opening formed in said plate adapted to align with a predetermined radiant energy sensing device upon said plate being oriented relative to said interrogation means in said predetermined manner.

3. In radiant energy responsive animal actuated apparatus as in claim 2 wherein said plate includes an edge, said opening comprising a notch defined in said edge.

4. In radiant energy responsive animal actuated apparatus as in claim 3, a plurality of notches defined in said plate edge.

5. In radiant energy responsive animal actuated apparatus as in claim 2, a radiant energy source mounted adjacent said interrogation means adapted to introduce radiant energy into said radiant energy sensing devices, said actuator being located between said radiant energy source and radiant energy sensing devices upon being oriented adjacent said interrogation means in said pedetermined manner 6. In radiant energy responsive animal actuated apparatus as in claim 1 wherein said actuator member is formed of nonmagnetic material, said orientation means comprising a first magnetic element mounted on said interrogation means and a second magnetic element mounted on said actuator, at least one of said elements comprising a permanant magnet.

7. In radiant energy responsive animal actuated apparatus as in claim 6 wherein each of said elements comprise permanent magnets.

8. In radiant energy responsive animal actuated apparatus as in claim 7 wherein each of said elements comprise an elongated permanent bar magnet having ends of opposite polarity, the poles of said magnets being arranged on the associated interrogation member and actuator such that opposite poles of said magnet engage to produce the desired orientation of said interrogation and actuator members.

9. A actuator for an animal actuated apparatus adapted to be worn by the animal to be serviced comprising, in combination, an actuator body, information means defined upon said actuator body, and orientation means defined on said actuator body for orienting said actuator body to interrogation means, said information means being located upon said actuator body at a predetermined location relative to said orientation means.

10. In an actuator as in claim 9, said orientation means comprising a permanent magnet having poles of opposite polarity.

11. In an actuator as in claim 9, said information means comprising a radiant energy opaque member having at least one radiant energy transmitting window defined therein.

12. In an actuator as in claim 11, a necklace attached to said radiant energy opaque member for suspending said member from the neck of the animal to be serviced, said member having an edge, said window comprising a notch defined in said member intersecting said edge.

13. A selective animal feeder system comprising, in combination, a feed container, a feed trough having an access opening, electrically energized feed transfer means selectively transferring feed from said container to said trough during energization of said transfer means, information interrogation means mounted adjacent said access opening controlling operation of said feed transfer means, an actuator worn by the animal to be fed, information means defined upon said actuator adapted to be interpreted by said interrogation means upon said actuator being disposed adjacent said interrogation means, and mutually cooperating orientation means located adjacent said interrogation means and upon said actuator orientating said actuator relative to said interrogation means in a predetermined manner upon said actuator being brought into proximity to said interrogation means by the animal to be fed permitting interpretation of said information means by said interrogation means.

14. In a selective animal feeder system as in claim 13, wherein said orientation means comprises a first permanent magnet mounted adjacent said access opening and a second permanent magnet mounted upon said actuator.

* * * * *